United States Patent
Kamizawa et al.

(10) Patent No.: US 11,018,617 B2
(45) Date of Patent: May 25, 2021

(54) ROTATION ANGLE DETECTION DEVICE AND AC ROTATING MACHINE CONTROL DEVICE

(71) Applicant: Mitsubishi Electric Corporation, Tokyo (JP)

(72) Inventors: Hayato Kamizawa, Hyogo (JP); Kiyohiro Morita, Tokyo (JP); Michitaka Fujiwara, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 16/606,798

(22) PCT Filed: May 24, 2017

(86) PCT No.: PCT/JP2017/019412
§ 371 (c)(1),
(2) Date: Oct. 21, 2019

(87) PCT Pub. No.: WO2018/216149
PCT Pub. Date: Nov. 29, 2018

(65) Prior Publication Data
US 2020/0382044 A1 Dec. 3, 2020

(51) Int. Cl.
*H02P 29/028* (2016.01)
*H02P 6/17* (2016.01)

(52) U.S. Cl.
CPC .............. *H02P 29/028* (2013.01); *H02P 6/17* (2016.02)

(58) Field of Classification Search
CPC ................................ H02P 29/028; H02P 6/17
USPC ............................................ 318/400.01, 700
See application file for complete search history.

(56) References Cited

U.S. PATENT DOCUMENTS 8,773,054 B2 * 7/2014 Goto ..................... B60W 20/50
318/400.26

FOREIGN PATENT DOCUMENTS

| JP | 2014-195352 A | 10/2014 |
| JP | 2015-181345 A | 10/2015 |
| JP | 2016-073157 A | 5/2016 |
| JP | 6005393 B2 | 10/2016 |

OTHER PUBLICATIONS

International Search Report for PCT/JP2017/019412 dated Aug. 15, 2017 (PCT/ISA/210).

* cited by examiner

*Primary Examiner* — David Luo
(74) *Attorney, Agent, or Firm* — Sughrue Mion, PLLC; Richard C. Turner

(57) ABSTRACT

Provided is a rotation angle detection device, including: a rotation angle sensor; an input circuit configured to output a rotation angle signal and an abnormality signal; a calculation processing unit con tired to calculate a rotation angle calculation value and a rotation speed calculation value based on a rotation angle detection value at a predetermined preset calculation timing; and a rotation angle estimation processing unit configured to calculate a rotation angle estimation value after the calculation timing based on the rotation angle calculation value and the rotation speed calculation value. When the abnormality signal is received, the calculation processing unit calculates the rotation angle calculation value and the rotation speed calculation value based on the rotation angle estimation value, in place of the rotation angle detection value.

12 Claims, 3 Drawing Sheets

ROTATION ANGLE DETECTION DEVICE AND AC ROTATING MACHINE CONTROL DEVICE

CROSS REFERENCE TO RELATED APPLICATIONS

This application is a National Stage of International Application No. PCT/JP2017/019412 filed May 24, 2017.

TECHNICAL FIELD

The present invention relates to a rotation angle detection device which can cover a case in which when a contact failure or the like occurs in a sensor configured to detect a rotation angle of a motor, and an AC rotating machine control device.

BACKGROUND ART

In control of a brushless motor, it is required to apply a voltage to a coil of a motor in response to a rotation angle of the motor so that a rotation angle sensor is required. Hitherto, as the rotation angle sensor, a resolver is widely used because of robustness and environmental resistance caused by its simple configuration.

Based on a deviation between a current detected rotation angle and a previous detected rotation angle, there is a related-art technology configured to detect an abnormality of the rotation angle sensor (for example, see Patent Literature 1). In particular, when the deviation between the current detected rotation angle and the previous detected rotation angle is equal to or higher than a predetermined value, a rotation angle estimation device of a resolver in abnormality according to the Patent Literature 1 determines an abnormality in AD conversion. When the rotation angle estimation device of a resolver in abnormality determines the abnormality in AD conversion, the rotation angle estimation device of a resolver in abnormality according to Patent Literature 1 adds an estimated value based on a previous rotation angle variation amount to a previous detected rotation angle to estimate the current detected rotation angle.

CITATION LIST

Patent Literature

[PTL 1] JP 6005393 B

SUMMARY OF INVENTION

Technical Problem

However, the related-art technology has the following problem. In detection of the rotation angle, there are some cases to use an external resolver-digital converter (RDC) IC or the like, in which an output rotation angle is subjected to an internal filtering process. Even when a state, in which the resolver signal is not read correctly due to a contact failure or the like, occurs, it is conceived that a rotation angle after the filtering process may be output to a calculation processing device (hereinafter, referred to as microcomputer).

In this case, a failure diagnosis function of the external RDC IC notifies occurrence of abnormality to the microcomputer through communication or a digital signal. However, detection of the abnormality requires a certain amount of time. Therefore, after the microcomputer receives the abnormality notification, even when the microcomputer starts angle estimation, there is a problem in which the estimated rotation angle differs greatly from an actual rotational angle.

The present invention has been made to solve the problem as described above, and therefore an object of the present invention is to provide a rotation angle detection device capable of outputting a rotation angle estimation value more quickly and more accurately compared to the related-art device even when the abnormality of the rotation angle sensor occurs, and to provide an AC rotating machine control device.

Solution to Problem

A rotation angle detection device according to one embodiment of the present invention includes: a rotation angle detection device, including: a rotation angle sensor configured to detect a rotation angle of an AC rotating machine; an input circuit, which is configured to receive an output signal from the rotation angle sensor, to thereby output a rotation angle signal, and is configured to output an abnormality signal when an abnormality in the output signal is detected; a rotation angle detection processing unit configured to detect a rotation angle based on the rotation angle signal; a calculation processing unit configured to calculate a rotation angle calculation value and a rotation speed calculation value, which are used for controlling the AC rotating machine, based on a rotation angle detection value, which is detected by the rotation angle detection processing unit at a predetermined preset calculation timing; and a rotation angle estimation processing unit configured to calculate a rotation angle estimation value after the calculation timing based on the rotation angle calculation value and the rotation speed calculation value, wherein, when the abnormality signal is received from the input circuit, the calculation processing unit calculates the rotation angle calculation value and the rotation speed calculation value based on the rotation angle estimation value, which is calculated by the rotation angle estimation processing unit, in place of the rotation angle detection value detected by the rotation angle detection processing unit, at a calculation timing, at which the abnormality in the output signal is not detected.

Further, an AC rotating machine control device according to one embodiment of the present invention includes: the rotation angle detection device of the present invention; and a drive circuit configured to control the AC rotating machine based on the rotation angle calculation value and the rotation speed calculation value calculated by the calculation processing unit.

Advantageous Effects of Invention

According to the present invention, in a case in which the external RDC IC or the like is used, even when the abnormal state, in which the input circuit cannot read the signal of the rotation angle sensor correctly due to the contact failure of the signal line of the rotation angle sensor, or the like, occurs, and the external RDC IC notifies the abnormal state to the microcomputer after a certain amount of time, the configuration is formed, in which the rotation angle estimated based on the rotation angle and the rotation speed in the normal state at the predetermined time in the past can be used at the timing of detecting the abnormal state. As a result, even when the abnormality of the rotation angle sensor occurs, as compared to the related-art device, the rotation angle detection device which can output the rotation angle estimation value more quickly and more accurately, and the AC rotating machine control device can be obtained.

DESCRIPTION OF EMBODIMENTS

Hereinafter, a description is given of a preferred embodiment of a rotation angle detection device and an AC rotating machine control device of the present invention with reference to the accompanying drawings.

First Embodiment

Figure 1:
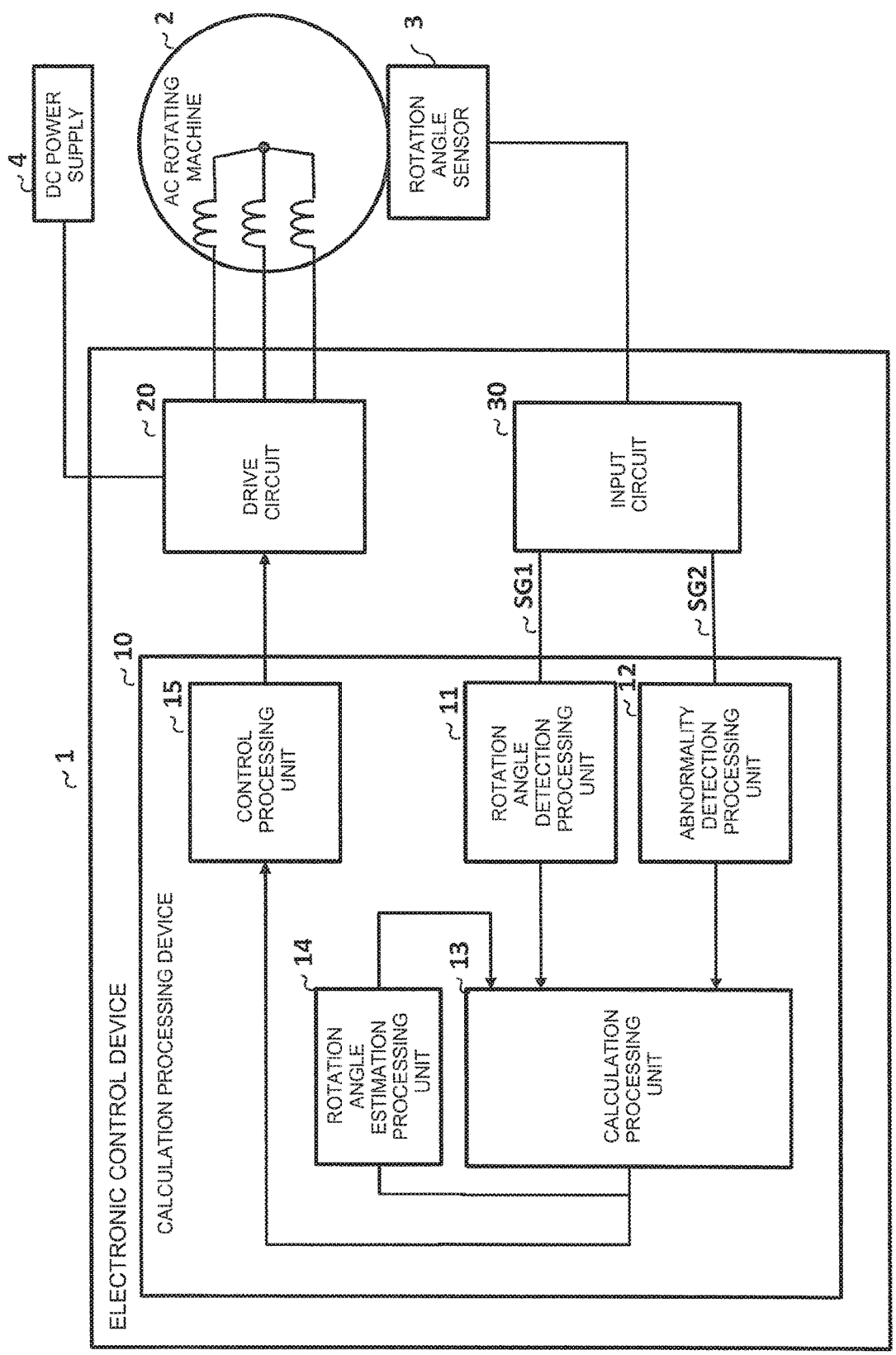
FIG. 1 is a circuit block diagram for illustrating a configuration example of an on-board electronic control device of an AC rotating machine according to a first embodiment of the present invention.

FIG. 1 is a circuit block diagram for illustrating a configuration example of an on-board electronic control device of an AC rotating machine according to a first embodiment of the present invention. An electronic control device 1 illustrated in FIG. 1 controls the number of rotations of an AC rotating machine 2 based on a detected result of a rotation angle sensor 3.

The electronic control device is connected to a DC power supply 4, and includes a calculation processing device 10, a drive circuit 20, and an input circuit 30. Further, the calculation processing device 10 includes a rotation angle detection processing unit 11, an abnormality detection processing unit 12, a calculation processing unit 13, a rotation angle estimation processing unit 14, and a control processing unit 15.

Here, the configuration including the calculation processing device 10 and the input circuit 30 corresponds to a configuration of a rotation angle detection device. Further, the electronic control device 1 connected to the AC rotating machine 2 as a control target corresponds to an AC rotating machine control device.

The electronic control device 1 of the first embodiment illustrated in FIG. 1 particularly has features of the following configurations.

The rotation angle estimation processing unit 14 configured to estimate a rotation angle at a predetermined period based on a rotation angle SG1 output by the input circuit 30.

The abnormality detection processing unit 12 configured to detect an abnormality of the input circuit 30 based on an abnormality signal output from the input circuit 30.

The calculation processing unit 13 configured to use, as a rotation angle signal for controlling the motor, a calculated result of the rotation angle detection processing unit 11 at a normal state, and configured to use a calculated result of the rotation angle estimation processing unit 14 at an abnormal state.

With such a configuration, the electronic control device 1 according to the first embodiment can calculate a rotation angle using a signal, which has been estimated before an occurrence of the abnormality, of the rotation angle estimation processing unit 14 even when the abnormality of the input circuit 30 is detected after a predetermined time elapses from the occurrence of the abnormality of a resolver signal. Therefore, the electronic control device 1 according to the first embodiment can quickly switch to a rotation angle estimation value with high accuracy even when the abnormality occurs in the resolver signal.

Next, in accordance with the block diagram of FIG. 1, specific operation of the electronic control device of the first embodiment is described in detail. The electronic control device 1 illustrated in FIG. 1 is mounted to an electric vehicle such as an electric automobile or a hybrid automobile, and controls the AC rotating machine 2 which acts as a driving source and as a generator.

The electronic control device 1 includes the calculation processing device 10 and the drive circuit 20. The drive circuit 20 converts a PWM signal generated by the calculation processing device 10 to a three-phase AC voltage to apply the voltage to the AC rotating machine 2.

The electronic control device 1 is connected to the rotation angle sensor 3 configured to detect an angle of the AC rotating machine 2. The input circuit 30 generates the digital rotation angle signal SG1 based on the resolver signal. The input circuit 30 corresponds to, for example, an external RDC IC. The digital rotation angle signal SG1 generated by the input circuit 30 is input to the rotation angle detection processing unit 11 in the calculation processing device 10.

Further, the input circuit 30 having a function of an abnormality detection process generates an abnormality signal SG2 when the abnormality occurs in the resolver signal. The abnormality detection process of the input circuit 30 requires several ms to several tens of ms (e.g., 20 ms) since the abnormality occurs until the abnormality is detected. The abnormality signal SG2 generated by the input circuit 30 is input to the abnormality detection processing unit 12 in the calculation processing device 10.

The rotation angle detection processing unit 11 in the calculation processing device 10 periodically, for example, every 100 microseconds detects a rotation angle of the AC rotating machine 2 based on the digital rotation angle signal SG1. Further, the calculation processing unit 13 calculates rotation speed w of the AC rotating machine 2 based on a time change of an angle detected by the rotation angle detection processing unit 11.

The abnormality detection processing unit 12 in the calculation processing device 10 obtains the abnormality signal SG2 from the input circuit 30 to detect an abnormality of the rotation angle sensor 3. An abnormality detecting process of the abnormality detection processing unit 12 requires several ms to several tens of ms (e.g., 20 ms) since the abnormality occurs until the abnormality is detected.

The rotation angle estimation processing unit 14 in the calculation processing device 10 uses a past calculated rotation angle calculated by the calculation processing unit 13 to estimate a current rotation angle.

Figure 2:
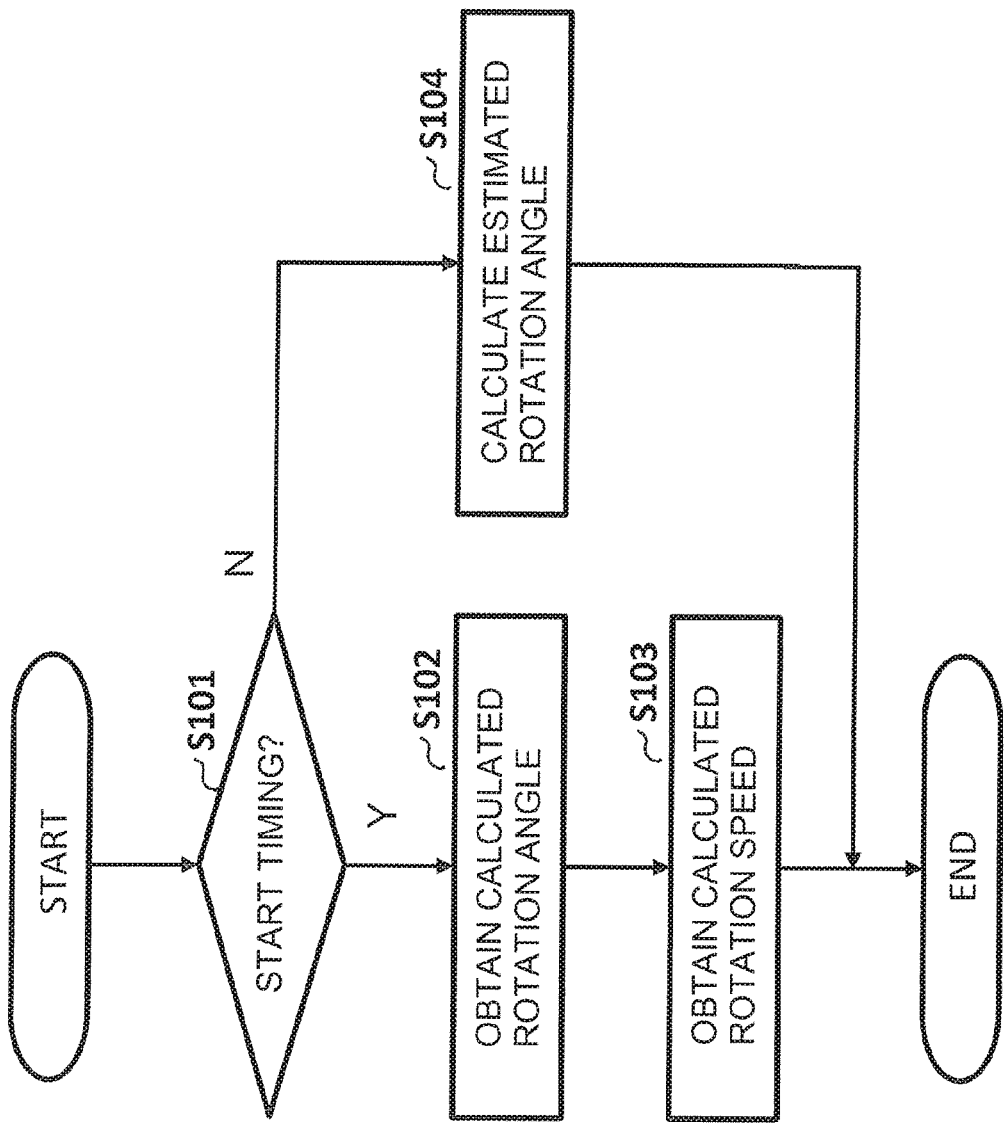
FIG. 2 is a flowchart for illustrating a series of processes by a rotation angle estimation processing unit 14 of the first embodiment of the present invention.

FIG. 2 is a flowchart for illustrating a series of processes by the rotation angle estimation processing unit 14 of the first embodiment of the present invention. At first, in Step S101, the rotation angle estimation processing unit 14 determines whether it is a start timing of the estimation process. Then, when the rotation angle estimation processing unit 14 determines that it is the start timing of the estimation process, a procedure proceeds to a process of Step S102, and when the rotation angle estimation processing unit 14 determines that it is not the start timing of the estimation process, the procedure proceeds to a process of Step S104.

When the procedure advances to Step S102, the rotation angle estimation processing unit 14 obtains the rotation angle calculated by the calculation processing unit 13 as an estimated rotation angle θe. Further, in Step S103, the rotation angle estimation processing unit 14 obtains the rotation speed calculated by the calculation processing unit 13 as rotation speed Δθ.

Meanwhile, when the procedure advances to Step S104 as it is not the start timing, the rotation angle estimation processing unit 14 uses the rotation angle obtained in Step S102 and the rotation speed obtained in Step S103 at the time of start timing to estimate a rotation angle In this case, when a calculation period of the rotation angle estimation processing unit 14 is defined as T, and an estimated rotation angle, when the number of calculations is n-times, is defined as $\theta e_n$, $\theta e_n$ can be estimated by the following equation.

$$\theta e_n = \text{Mod}(\theta e_{n-1} + \Delta\theta T, 2\pi) \text{ [rad]}$$

where, Mod(Modulo) is a remainder calculation.

The calculation processing unit 13 in the calculation processing device 10 calculates a rotation angular velocity based on the rotation angle detected by the rotation angle detection processing unit 11 through a filter.

The calculation processing unit 13 has, for example, a PLL filter as a filter. The PLL filter can filter an instantaneous noise generated in an output signal of the rotation angle sensor 3 by adjusting gains Kp and Ki.

When the abnormality is notified to the calculation processing unit 13 from the abnormality detection processing unit 12 due to disconnection of the rotation angle sensor 3 or the like, the calculation processing unit 13 uses the rotation angle estimation value ee of the rotation angle estimation processing unit 14 to calculate the rotation speed w.

For example, when a vibrating noise occurs in the output signal of the rotation angle sensor 3 due to disconnection of the rotation angle sensor 3 or the like, the calculation processing unit 13 uses the rotation angle estimation value ee to calculate the rotation angular velocity so that the rotation angular velocity can be converged to the estimated value.

The control processing unit 15 in the calculation processing device 10 uses the rotation angle and the rotation speed output from the calculation processing unit 13 to control the AC rotating machine 2.

The start timing described above is an immediate time in the past when the abnormality is notified from the abnormality detection processing unit 12, and Step S102 and Step S103 may be executed at a time during the normal state of the rotation angle sensor 3. Therefore, the start timing can be set at an appropriate period in consideration of a delay time since the abnormality in the output signal of the rotation angle sensor 3 actually occurs until the abnormality signal is output from the input circuit 30.

Figure 3:
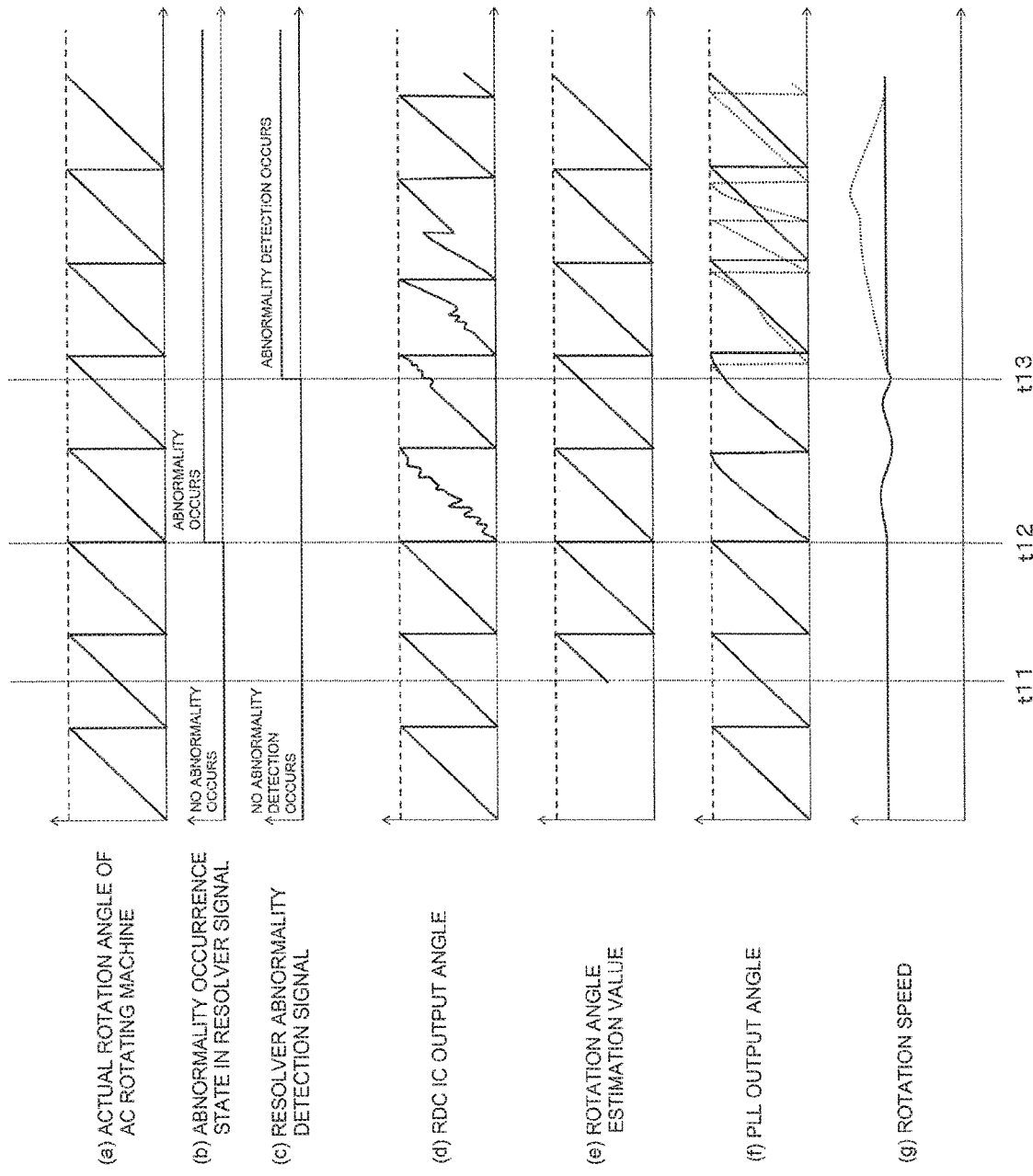
FIG. 3 is a timing chart for describing operation and an effect by an electronic control device 1 of the first embodiment of the present invention.

Next, a description is given of operation and an effect of the electronic control device 1 of the first embodiment configured as described above. FIG. 3 is a timing chart for illustrating the operation and the effect by the electronic control device 1 of the first embodiment of the present invention. FIG. 3 is a timing chart when disconnection in the output signal of the rotation angle sensor 3 occurs under a state in which the rotation speed of the AC rotating machine 2 is constant.

In FIG. 3, from the top, time variations of seven signal states of the following (a) to (g) are illustrated in that order.
(a) actual rotation angle of the AC rotating machine
(b) abnormality occurred state in the resolver signal
(c) resolver abnormality detection signal
(d) RDC IC output angle
(e) rotation angle estimation value
(f) PLL output angle
(g) rotation speed A time t11 of FIG. 3 corresponds to the start timing of the rotation angle estimation process in the flowchart illustrated in FIG. 2 described above. Therefore, a rotation angle estimation value after the time t11 is estimated based on the calculated rotation angle and rotation speed at the time t11.

When the abnormality occurs in the output signal of the rotation angle sensor 3 at a time t12, as illustrated in (d), a vibrating noise is generated in the rotation angle. With the influence, the PLL output angle in the calculation processing unit 13 illustrated in (f) deviates from the rotation angle estimation value of (e). Further, as illustrated in (f), the PLL output angle breaks greatly as illustrated by a dashed line, and the rotation speed cannot be maintained constant, and hence the PLL output angle deviates from the estimated value as illustrated by a dashed line illustrated in (g).

When the abnormality in the output signal of the rotation angle sensor 3 is detected by the abnormality detection processing unit 12 at a time t13, the calculation processing device 10 switches an input signal of the PLL filter in the calculation processing unit 13 from the RDC IC output angle of (d) to the rotation angle estimation value of (e) calculated after the time t11.

Thus, the PLL output angle illustrated in (f) approaches the rotation angle estimation value of (e) estimated by the rotation angle estimation processing unit 14. Further, the calculation processing unit 13 uses the rotation speed calculated based on the rotation angle estimation value estimated by the rotation angle estimation processing unit 14 so that variations in the number of rotations can be also suppressed.

As described above, even when the abnormality in the output signal of the rotation angle sensor 3 by disconnection or the like occurs, the rotation angle and the rotation speed are estimated and calculated based on the rotation angle and the rotation speed at a predetermined time in the past before the abnormality occurs, and hence it is possible to quickly switch to the rotation speed estimated accurately.

In the above described embodiment, the case in which the single-phase AC rotating machine has been exemplified as a controlled target, but the present invention is not limited to such an embodiment. The rotation angle detection device and the AC rotating machine control device of the present invention may be applied to an AC rotating machine having more phases as an AC rotating machine.

REFERENCE SIGNS LIST 1 electronic control device, 2 AC rotating machine, 3 rotation angle sensor, 4 DC power supply, 10 calculation processing device, 11 rotation angle detection processing unit, 12 abnormality detection processing unit, 13 calculation processing unit, 14 rotation angle estimation processing unit, 15 control processing unit, 20 drive circuit, 30 input circuit

The invention claimed is:
1. A rotation angle detection device, comprising:
a rotation angle sensor configured to detect a rotation angle of an AC rotating machine;
an input circuit, which is configured to receive an output signal from the rotation angle sensor, to thereby output a rotation angle signal, and is configured to output an abnormality signal when an abnormality in the output signal is detected;

a rotation angle detection processor configured to detect a rotation angle based on the rotation angle signal;

a calculation processor configured to calculate a rotation angle calculation value and a rotation speed calculation value, which are used for controlling the AC rotating machine, based on a rotation angle detection value, which is detected by the rotation angle detection processor at a predetermined preset calculation timing; and a rotation angle estimation processor configured to calculate a rotation angle estimation value after the calculation timing based on the rotation angle calculation value and the rotation speed calculation value, wherein, when the abnormality signal is received from the input circuit, the calculation processor calculates the rotation angle calculation value and the rotation speed calculation value based on the rotation angle estimation value, which is calculated by the rotation angle estimation processor, in place of the rotation angle detection value detected by the rotation angle detection processor, at a calculation timing, at which the abnormality in the output signal is not detected.

2. The rotation angle detection device according to claim 1, wherein the calculation timing is set based on a delay time since the abnormality in the output signal actually occurs until the abnormality signal is output by the input circuit.

3. The rotation angle detection device according to claim 2, wherein the calculation processor comprises a filter configured to subject a noise contained in the output signal from the rotation angle sensor to a filtering process, and calculates the rotation angle calculation value and the rotation speed calculation value after the filtering process is executed to the rotation angle detection value.

4. The rotation angle detection device according to claim 3, wherein, when the abnormality signal is received from the input circuit, the calculation processor calculates the rotation angle calculation value and the rotation speed calculation value after the filtering process is executed with respect to the rotation angle estimation value calculated by the rotation angle estimation processor.

5. An AC rotating machine control device, comprising:
the rotation angle detection device of claim 4; and
a drive circuit configured to control the AC rotating machine based on the rotation angle calculation value and the rotation speed calculation value calculated by the calculation processor.

6. An AC rotating machine control device, comprising:
the rotation angle detection device of claim 3; and
a drive circuit configured to control the AC rotating machine based on the rotation angle calculation value and the rotation speed calculation value calculated by the calculation processor.

7. An AC rotating machine control device, comprising:
the rotation angle detection device of claim 2; and
a drive circuit configured to control the AC rotating machine based on the rotation angle calculation value and the rotation speed calculation value calculated by the calculation processor.

8. The rotation angle detection device according to claim 1, wherein the calculation processor comprises a filter configured to subject a noise contained in the output signal from the rotation angle sensor to a filtering process, and calculates the rotation angle calculation value and the rotation speed calculation value after the filtering process is executed to the rotation angle detection value.

9. The rotation angle detection device according to claim 8, wherein, when the abnormality signal is received from the input circuit, the calculation processor calculates the rotation angle calculation value and the rotation speed calculation value after the filtering process is executed with respect to the rotation angle estimation value calculated by the rotation angle estimation processor.

10. An AC rotating machine control device, comprising:
the rotation angle detection device of claim 9; and
a drive circuit configured to control the AC rotating machine based on the rotation angle calculation value and the rotation speed calculation value calculated by the calculation processor.

11. An AC rotating machine control device, comprising:
the rotation angle detection device of claim 8; and
a drive circuit configured to control the AC rotating machine based on the rotation angle calculation value and the rotation speed calculation value calculated by the calculation processor.

12. An AC rotating machine control device, comprising:
the rotation angle detection device of claim 1; and
a drive circuit configured to control the AC rotating machine based on the rotation angle calculation value and the rotation speed calculation value calculated by the calculation processor.

* * * * *